United States Patent
Lin et al.

(10) Patent No.: US 7,404,048 B2
(45) Date of Patent: Jul. 22, 2008

(54) INTER-CLUSTER COMMUNICATION MODULE USING THE MEMORY ACCESS NETWORK

(75) Inventors: Tay-Jyi Lin, Hsinchu (TW); Pi-Chen Hsiao, Hsinchu (TW); Chih-Wei Liu, Hsinchu (TW); Chein-Wei Jen, Hsinchu (TW); I-Tao Liao, Hsinchu (TW); Po-Han Huang, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 273 days.

(21) Appl. No.: 11/246,115

(22) Filed: Oct. 11, 2005

(65) Prior Publication Data

US 2006/0212663 A1    Sep. 21, 2006

(30) Foreign Application Priority Data

Mar. 16, 2005   (TW) .............................. 94108081 A (51) Int. Cl.
*G06F 12/00* (2006.01)
(52) U.S. Cl. ........................... 711/150; 711/5; 711/148; 711/154; 712/203; 712/206
(58) Field of Classification Search ................. 711/150; 712/206
See application file for complete search history.

(56) References Cited

U.S. PATENT DOCUMENTS

| | | | | |
|---|---|---|---|---|
| 4,912,698 A | * | 3/1990 | Bitzinger et al. | ............. 370/244 |
| 5,377,333 A | * | 12/1994 | Nakagoshi et al. | ........... 710/317 |
| 5,923,339 A | * | 7/1999 | Date et al. | ................... 345/505 |
| 6,549,990 B2 | * | 4/2003 | Hughes et al. | ............... 711/146 |
| 6,629,232 B1 | | 9/2003 | Arora et al. | |
| 6,948,050 B1 | * | 9/2005 | Gove et al. | ..................... 712/35 |

FOREIGN PATENT DOCUMENTS

WO       WO 00/54144       9/2000

OTHER PUBLICATIONS

Scott Rixner et al., "Register Organization for Media Processing." date unknown.
Paolo Faraboschi et al., "Lx: A Technology Platform for Customizable VLIW Embedded Processing." 2000.
"TMS320C6000 CPU and Instruction Set Reference Guide." Literature No. SPRU189F, Oct. 2000.
Andrei Terechko et al., "Inter-cluster Communication Models for Clustered VLIW Processors." 2002 IEEE.
R.E.Kessler, "The Alpha 21264 Microprocessor." 1999 IEEE.

* cited by examiner

*Primary Examiner*—Donald Sparks
*Assistant Examiner*—Hashem Farrokh
(74) *Attorney, Agent, or Firm*—Harness Dickey & Pierce, P.L.C.

(57) ABSTRACT

An inter-cluster communication module using the memory access network is provided, including a plurality of clusters, a memory subsystem, a controller and a switch device. When some clusters issue a load instruction and some clusters issue a store instruction of an identical memory address concurrently, the controller controls the switch device which connects the clusters and the memory banks of the memory subsystem, so that the data item is transmitted from the cluster issuing the store instruction to the cluster issuing the load instruction through the switch device, thereby achieving data exchange between the clusters. Herein, the data item is selectively stored in the memory module depending on the address. Furthermore, the data item is also transmitted between the memory and the clusters over the switch device.

19 Claims, 7 Drawing Sheets

```
add r3, r2, r1;        |  nop;

store r3, a0;          |  load r1, a0;

nop;                   |  mul r3, r2, r1;
```

FIG. 10

INTER-CLUSTER COMMUNICATION MODULE USING THE MEMORY ACCESS NETWORK

CROSS REFERENCE TO RELATED APPLICATIONS

This Non-provisional application claims priority under 35 U.S.C. § 119(a) on Patent Application No(s). 94108081 filed in Taiwan on Mar. 16, 2005, the entire contents of which are hereby incorporated by reference.

BACKGROUND

1. Field of Invention

The invention relates to an inter-cluster communication module using a memory access network and, in particular, to the inter-cluster communication module using a memory access network for executing data exchange among clusters and data access to the memory.

2. Related Art

Nowadays, the design of a processor usually provides several parallel functional modules therein, so that the processor may process several instructions in parallel. As the number of functional modules increases, it eventually becomes a serious problem in the data exchange and stream among the functional modules.

Figure 1:
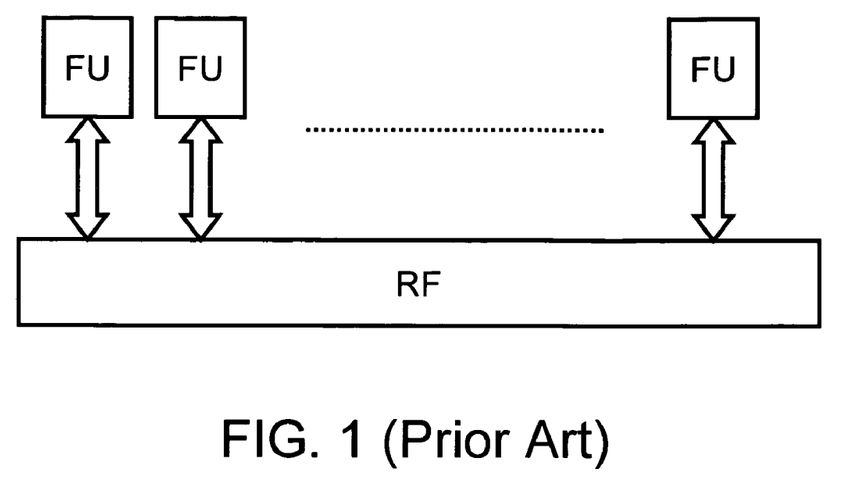
FIG. 1 is a block diagram of a traditional non-clustered architecture.

Initially, the processor is provided a centralized single register file RF to perform the data exchange among functional modules FU, as shown in FIG. 1. Under this architecture, a large amount of registers have to be provided inside the register file RF to maintain the smooth running of programs and the module rate of the functional modules FU. Moreover, the number of the connection ports (i.e. read and write ports) in the register file RF increases linearly with the number of the functional modules FU, to ensure that each functional module FU can obtain data required for operations. In fact, the data have their spatial locality during computations. That is, most of the functional modules exchange data only with their adjacent functional modules. However, it is actually a waste to provide a huge amount of connection ports simply for data exchange that rarely occurs. Therefore, the clustered architecture is developed to solve the problem of poor extensibility of the centralized register file.

Figure 2:
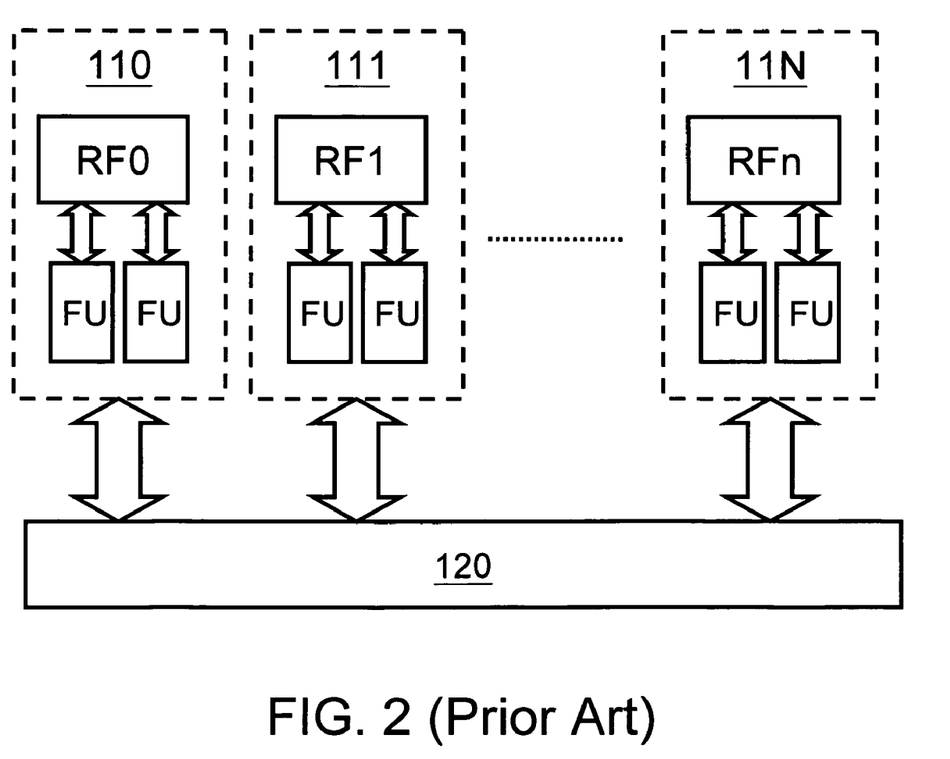
FIG. 2 is a block diagram of a traditional clustered architecture.

In clustered architecture, the functional modules FU, each having one or more functional units, are divided into several clusters 110, 111~11N. Consequently, the originally centralized register file is also divided into smaller register files RF0, RF1~RFn, each of which is responsible for the data exchange among the functional modules FU in each of the clusters 110, 111~11N. The data exchange among the clusters 110, 111~11N is implemented via some special switch device, i.e. the inter-cluster communication (ICC) network 120. This is illustrated in FIG. 2.

Figure 3:
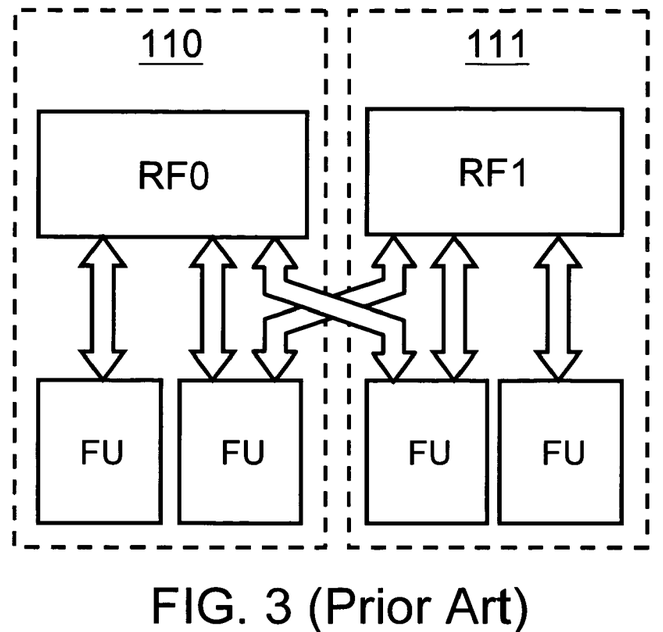
FIG. 3 is a data exchange method used in the architecture in FIG. 2.
Figure 4:
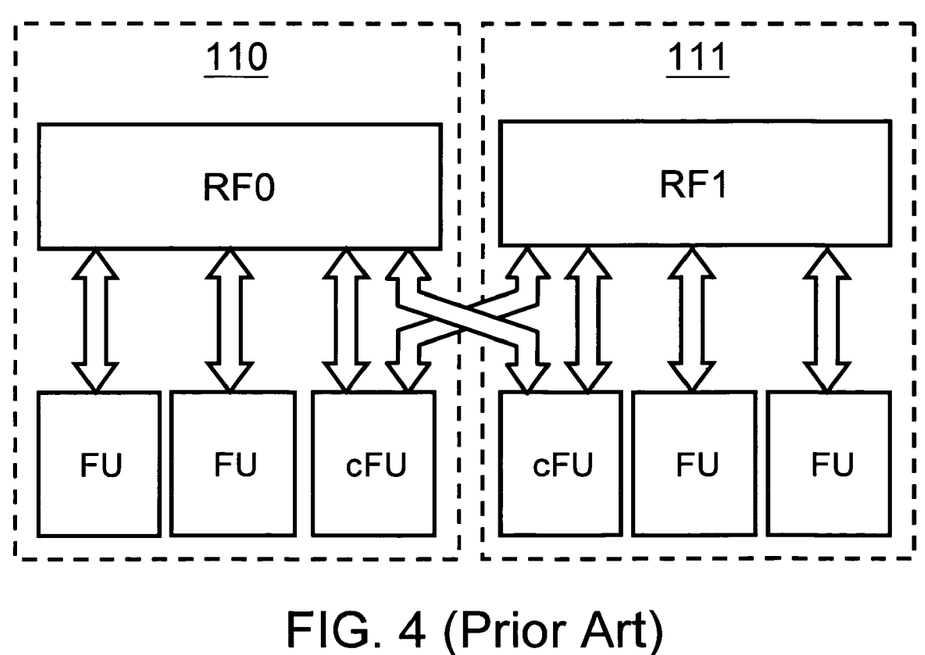
FIG. 4 is another data exchange method used in the architecture in FIG. 2.

The data exchange among the clusters may be achieved by executing a copy operation. That is, the copy instruction is executed to implement data transmission among the clusters. In this case, the copy instruction is executed using the original functional modules. In other words, the original functional modules FU are added with additional connection ports (i.e. load and store ports) to connect to the register files RF0, RF1 in another cluster 110, 111, as shown in FIG. 3. However, the data exchange among the clusters has to occupy one or several functional modules, such that the operation is not effectively executed. In another case, a specialized functional module cFU with complete connection ports (i.e. the input and output ports) is provided to implement the data exchange, as shown in FIG. 4. Moreover, these ways require the addition of a switch communication network and a controller to perform the switching for data exchange when the number of clusters is large.

Figure 5:
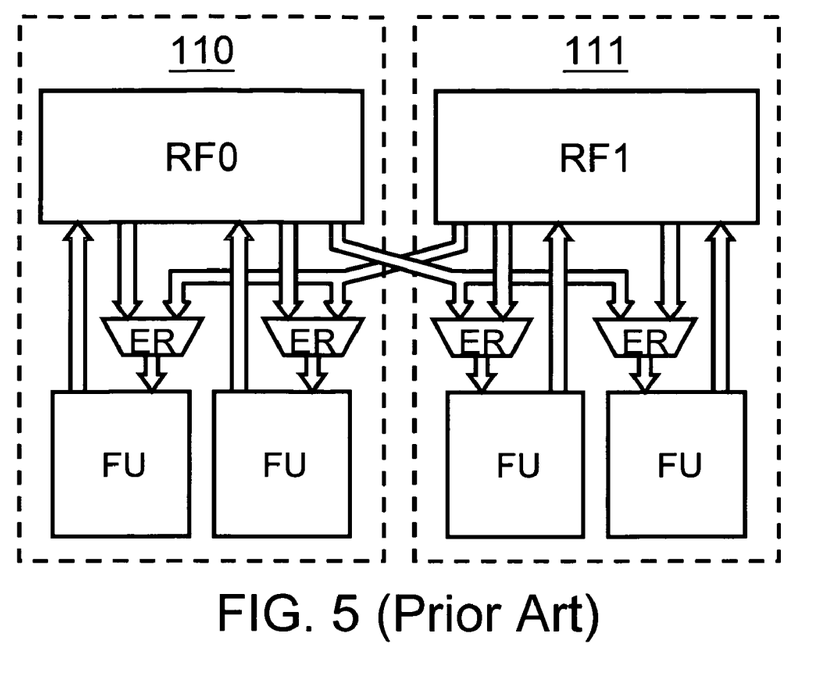
FIG. 5 is yet another data exchange method used in the architecture in FIG. 2.
Figure 6:
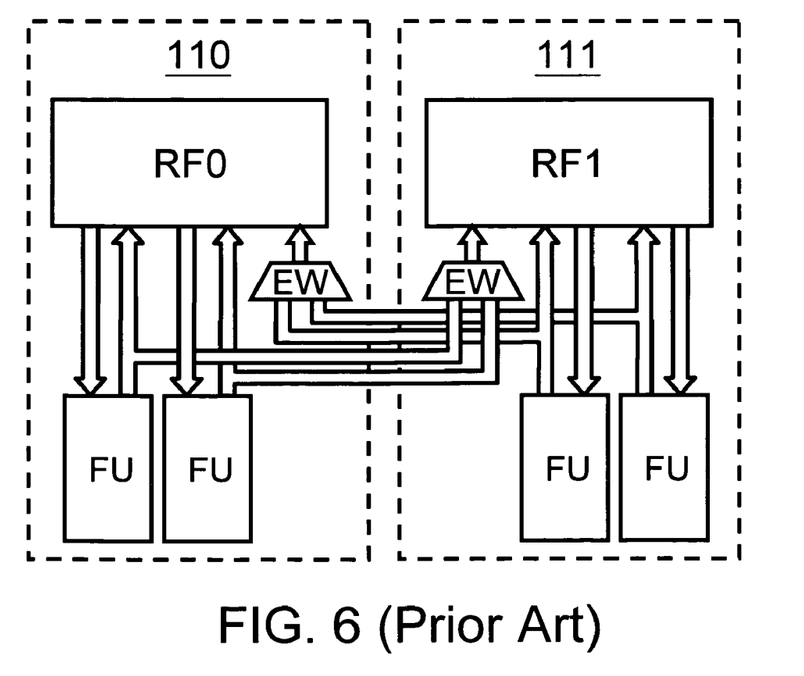
FIG. 6 is a further data exchange method used in the architecture in FIG. 2.

Besides, the data exchange among the clusters may be achieved using the way of extended access. Mainly, each of the register files of each cluster is added with an extra read port ER (FIG. 5) or an extra write port EW (FIG. 6), and these extra ports are connected to the functional modules of other clusters. Thus, the functional modules in each cluster have limited abilities in read or write the register files of other clusters. Nonetheless, this way still needs the addition of extra control units so as to detect whether there is any data exchange in the front stage of the pipeline. More a switch device (i.e. a communication network) is required carry out for data exchange.

In the above-mentioned ways, the data exchange is achieved by utilizing additional connection ports. As the number of clusters increases, the complexity of the communication network also increases. Moreover, in pipelined processors using the above methods, the forwarding network, which bypasses variables between the parallel instructions on the fly, has to cross the boundaries of all clusters, and the complexity of the switching network among clusters greatly increases. Otherwise, the functional modules of other clusters have to wait until the functional modules completely write the data into the register files before the operations start. This results in stalls. Moreover, the complicated communication network among the clusters is likely to become a critical path. The speed of the operation may be promoted by increasing the pipeline stages, but the more stages the pipeline has, the more difficult the forwarding thereof becomes.

SUMMARY

In view of the foregoing, an object of the invention is to provide an inter-cluster communication module using the memory access network to solve many problems and limitations existing in the prior art.

The disclosed inter-cluster communication module using the memory access network integrates the communication network among the clusters and the memory access network.

The disclosed inter-cluster communication module can access memory subsystems and execute data exchange among the cluster concurrently via the memory access network.

Using the memory access network, the disclosed inter-cluster communication module can perform inter-cluster data exchange without relying on the memory subsystems.

The disclosed inter-cluster communication module reduces the power consumption due to memory access.

The disclosed inter-cluster communication module can use the existing forwarding path to perform data exchange among the clusters in advance without waiting the register file to complete the store instruction.

To achieve the above objects, the disclosed inter-cluster communication module using the memory access network includes a memory subsystem, a controller, a switch device, and a plurality of clusters. The memory subsystem connects to all the clusters via the switch device. The controller is connected to the switch device. In particular, the memory subsystem has several memory banks to store a plurality of data. Each cluster is stored with a specific address. When two cluster issue a store instruction and a load instruction, respectively, to an identical memory address concurrently, the controller controls the switch device which connects the clusters and the memory banks of the memory subsystem, so that the data item is transmitted from the cluster issuing the store instruction to the cluster issuing the load instruction through the switch device, thereby achieving data exchange between the clusters. Besides, each memory bank in the memory subsystem has corresponding addresses. When a cluster issues a store or load instruction to the address of a memory bank, the cluster can use the switch device to access data in the memory bank with the address via the control of the controller.

Moreover, the controller has a detecting unit to detect the address and control instructions issued from the clusters. Therefore, when the detecting unit detects two identical addresses from two clusters concurrently to perform load and store actions on the corresponding memory bank in the memory subsystem, the controller directly transmits the data in the cluster that issues the store instruction to the cluster that issues the load instruction via the switch device.

Besides, the controller can be a memory controller. The switch device can be a memory access network.

Furthermore, each cluster includes: a register file and a plurality of functional modules connected to the register file. Here the register temporarily holds data. Each functional module has a plurality of functional units to perform all kinds of operations on the data in the register. The register has at least one local register to hold the address instructions of specific addresses. At least one of the functional units in each cluster is an access unit to issue store and load instructions.

BRIEF DESCRIPTION OF THE DRAWINGS

The invention will become more fully understood from the detailed description given herein below illustration only, and thus are not limitative of the present invention, and wherein.

DETAILED DESCRIPTION

Figure 7:
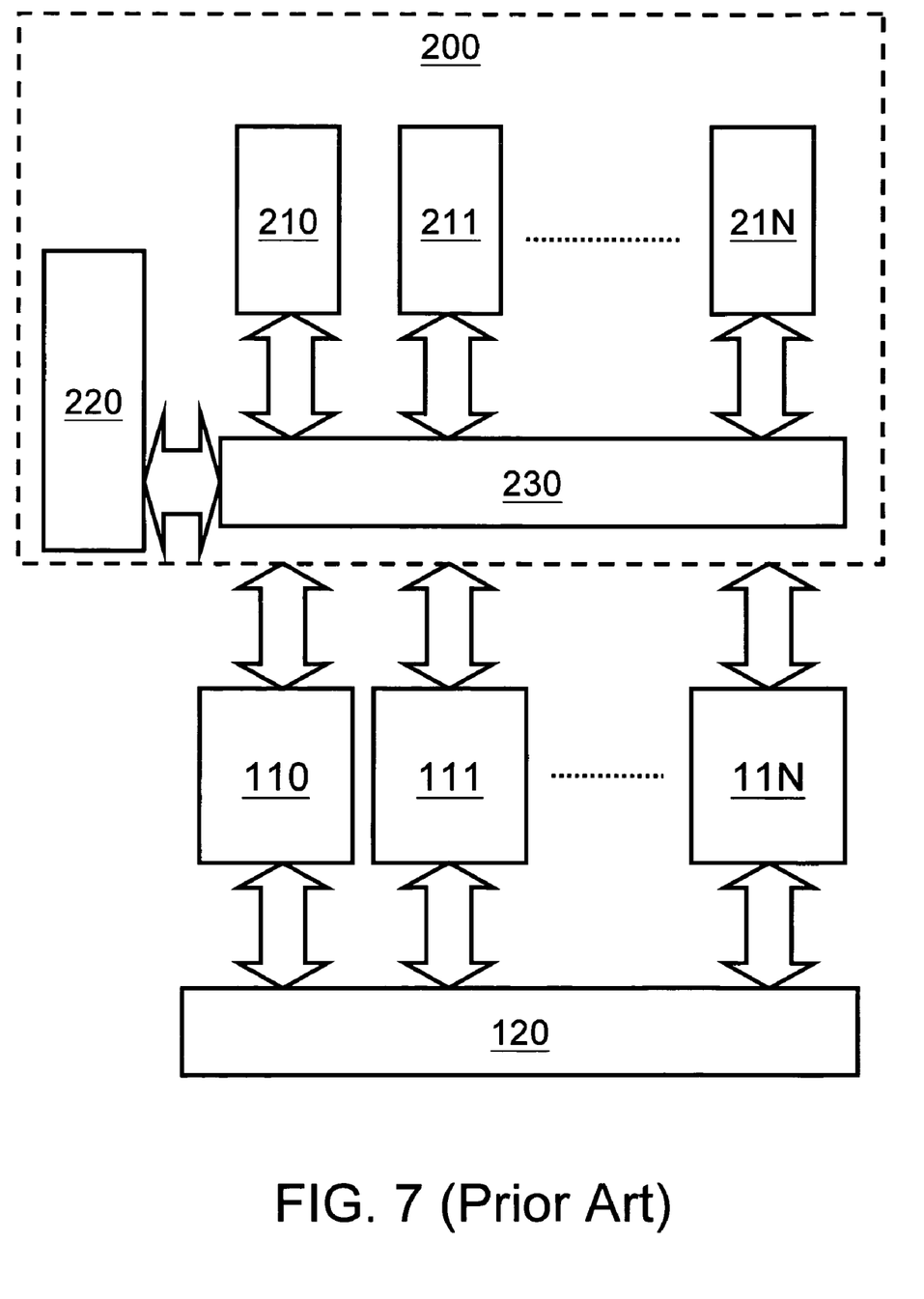
FIG. 7 is a block diagram of the traditional clustered architecture in FIG. 2 connecting to a memory subsystem.

Traditionally, the relation between the clusters and the memory subsystem is shown in FIG. 7. As shown in the drawing, a normal memory subsystem 200 has several memory banks 210, 211~21N. In a single addressing space, different memory banks 210, 211~21N are used to access simultaneously several sets of data to provide a sufficient bandwidth. However, each functional module (not shown) in the clusters 110, 111~11N may access several memory banks. Therefore, the memory subsystem 200 further has a memory controller 220 and a switch device (i.e., a memory access network 230). In particular, the memory controller 220 can complete the access of a specific memory bank according to the instructions from the clusters 110, 111~11N via the memory access network 230. That is, when accessing the memory, the accessing unit in the cluster issues the address and the control instructions to the memory controller. Afterwards, the memory controller accesses specific memory banks according to the address and control instructions. However, the primary idea of the invention is to use a single connection network to complete memory data access and data exchange among clusters.

Figure 8:
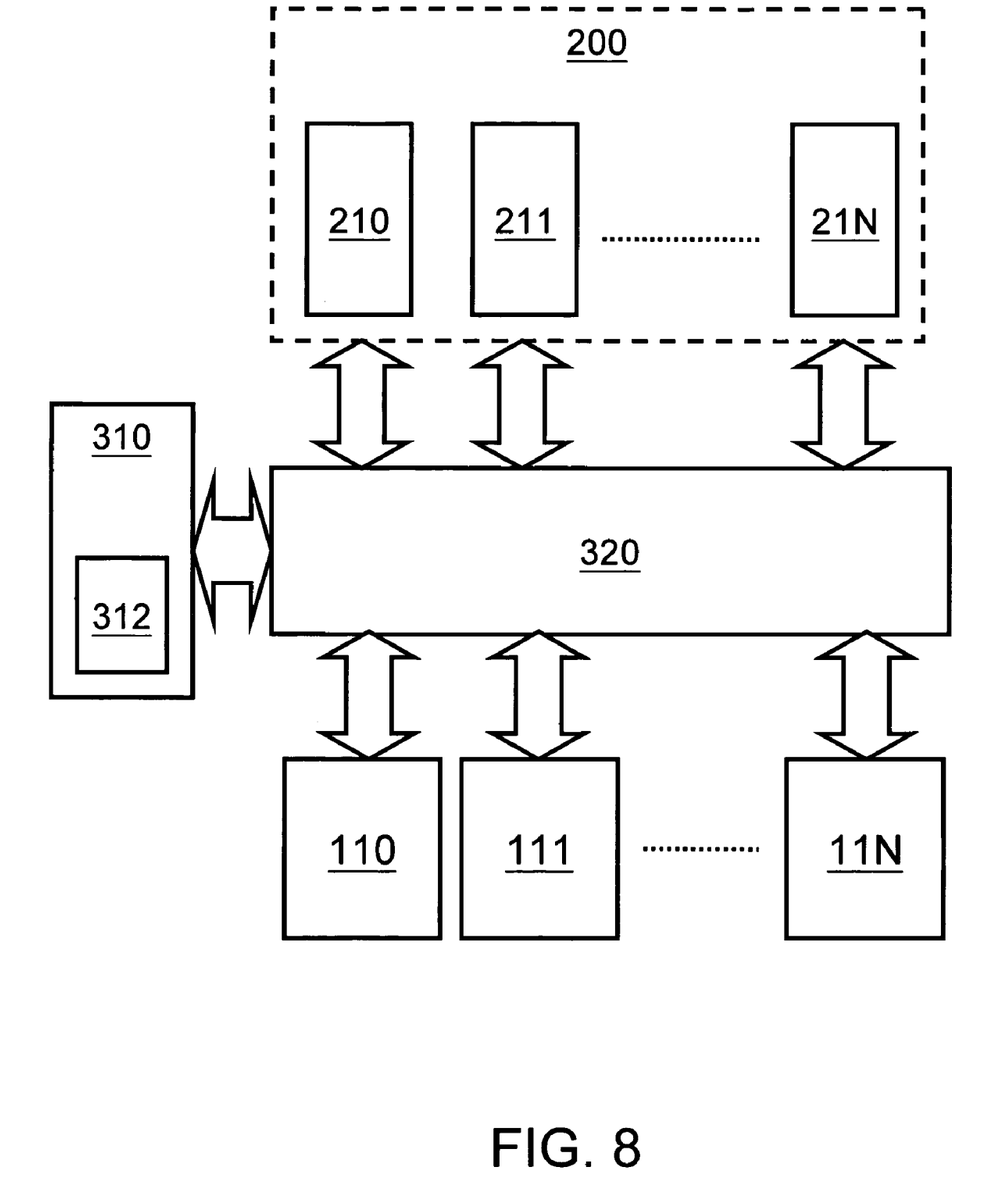
FIG. 8 is a block diagram of the inter-cluster communication module using the empty memory locations for data access according to an embodiment of the invention.

An inter-cluster communication module using empty memory location accessing, as shown in FIG. 8, includes: a memory subsystem 200, a controller 310, a switch device 320, and a plurality of clusters 110, 111~11N.

The memory subsystem 200 has a plurality of memory banks 210, 211~21N. The switch device 320 connects to all the clusters 110, 111~11N. The switch device 320 is used to transmit data. The controller 310 connected to the switch device 320 controls the data flow.

Under this architecture, each cluster includes a register file and at least one functional module. The register file has several registers, existing as real registers in all kinds of forms. Each functional module has at least one functional unit, existing in all kinds of forms, and involves a set of operations for performing specific tasks.

During the execution of the instructions, the functional units in the clusters 110, 111~11N issue an address and control instructions. The controller 310 controls the switch device 320 according to the control instructions, so that the clusters that issue instructions can access the corresponding memory banks in the memory subsystem 200. That is, the data in the corresponding memory bank are loaded into the register of the cluster that issues the instruction via the switch device 320, or stored into the corresponding memory bank via the switch device 320. The data loaded into the register are processed by the functional unit in the functional module and then written back to the register. In particular, the controller 310 is installed with a detecting unit 312 to detect the address and control instructions issued from the clusters 110, 111~11N. When detecting that two clusters issue identical address instructions to perform the load and store actions on the corresponding memory bank in the memory subsystem 200, the controller 310 enables the two clusters to access the memory subsystem 200 according to the store and load instructions. The data in the cluster that issues the store instruction are directly transmitted to the cluster that issues the load instruction via the switch device 320.

One of the registers in each register file is a local register, which is assigned with a specific address.

At this moment, when two clusters performs store and load operations on a specific address, the controller 310 directly issues data to the cluster that issues the load instruction via the switch device 320 without the use of the memory subsystem 200. Such data exchange among the clusters can avoid unnecessary power consumption due to constant memory accesses. In other words, when a functional unit of a cluster issues a specific address instruction and a store instruction while a functional unit of another cluster issues the same specific address instruction and a load instruction concurrently, the controller 310 transmits the data in the cluster that issues the store instruction to the cluster that issues the load instruction via the switch device 320.

Here the functional unit for issuing store and load instructions can be an access unit. The controller can be a memory controller. The switch device 320 can be a memory access network.

Figure 9:
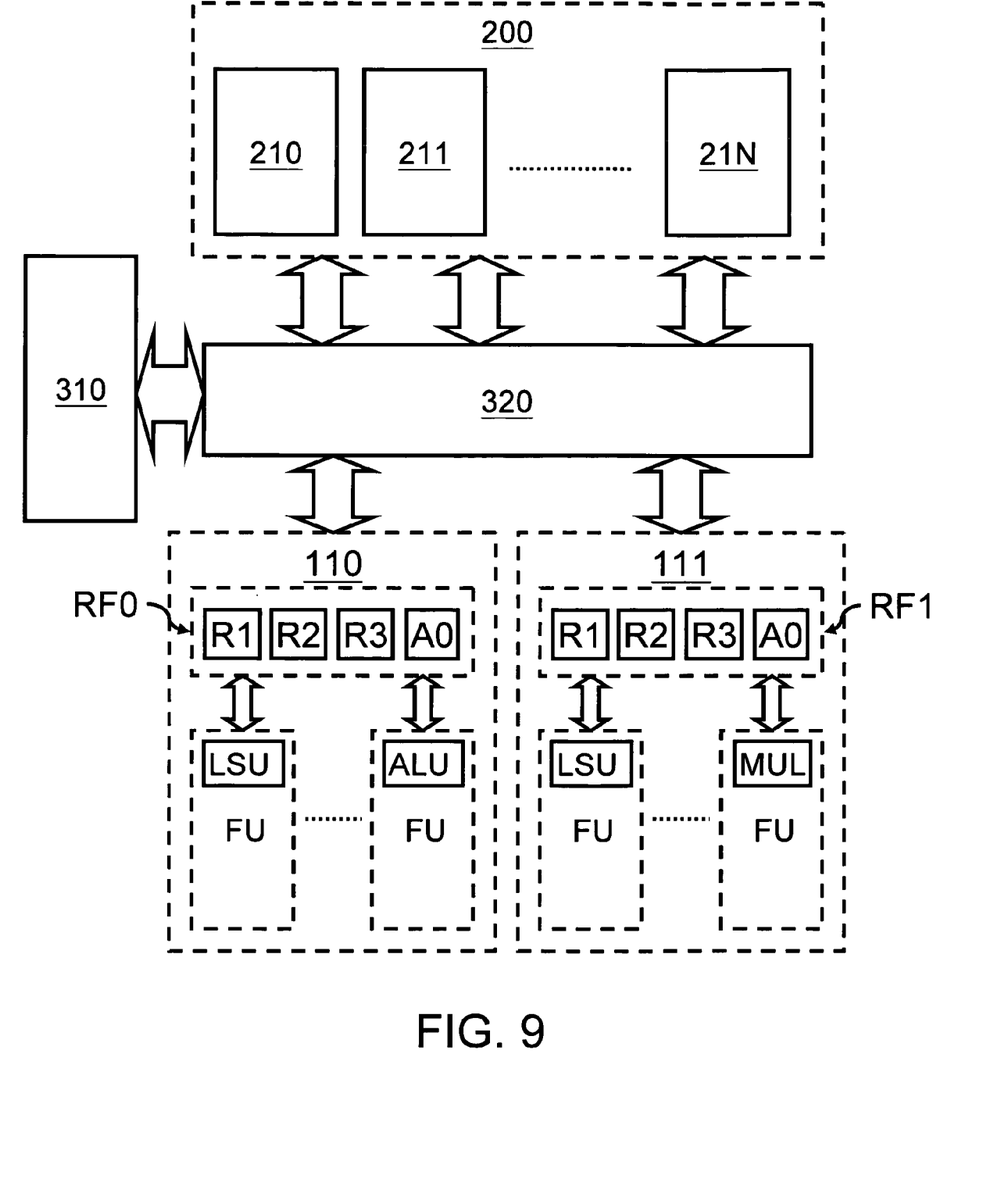
FIG. 9 is a block diagram of the inter-cluster communication module using the empty memory locations for data access according to another embodiment of the invention.
Figure 10:
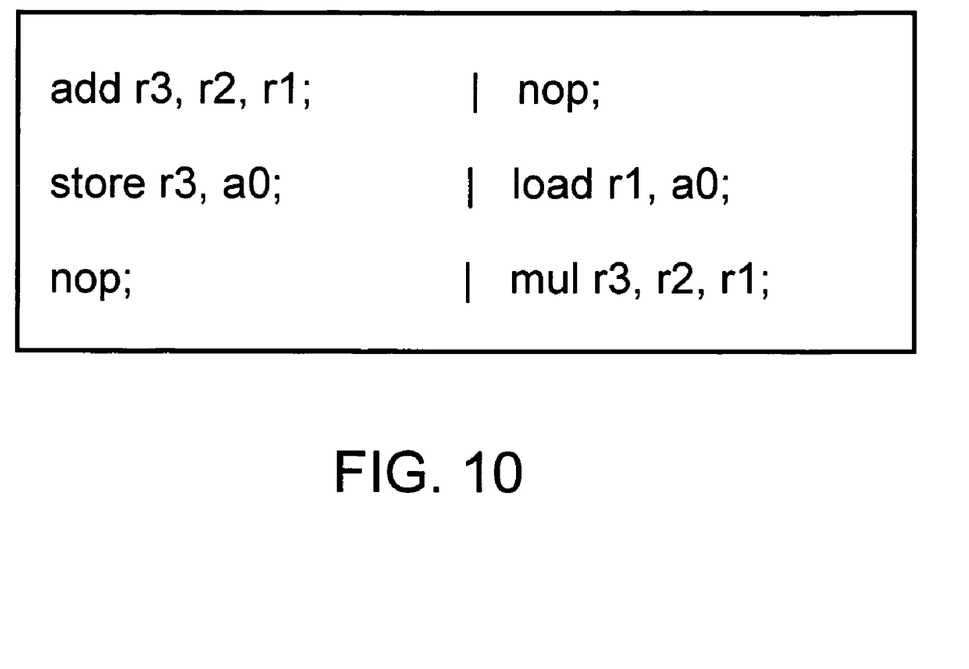
FIG. 10 is the program code of a VLIW for the architecture in FIG. 9.

For example, there are two clusters 110, 111 in an embodiment of the invention. Each of the register files RF0, RF1 in the clusters 110, 111 has registers R1, R2, R3, and a local register A0. The local register A0 is stored with a specific address a0. The functional modules FU of each cluster 110, 111 have a load/store unit (LSU), as shown in FIG. 9. The code of a very long instruction word (VLIW) of the above architecture is shown in FIG. 10. In the drawing, the left column lists the instructions of the cluster 110, and the right column lists the instructions of the cluster 111. With reference to FIGS. 9 and 10, suppose only the cluster 111 has a functional unit that does multiplication MUL. According to the add instruction, the data r1, r2 in the registers R1, R2 of the cluster 110 are added by the functional unit ALU and then stored in the register R3. Afterwards, the cluster 110 utilizes a store instruction to write the data r3 in the register R3 to the specific address a0. The cluster 111 utilizes the load instruction to load the data in the specific address a0 to the register R1. In this case, the controller 310 receives the address instruction for a0 and the control instruction (i.e. the store and load instructions). Therefore, the data r3 in the cluster 110 are transmitted directly to the cluster 111 according to the specific address instruction and control instruction via the switch device 320. The register R1 of the cluster 111 is loaded because it stores the data r1. Afterwards, the cluster 111 follows the multiplication instruction and uses the multiplication unit MUL to obtain the product of the data r1, r2 in the registers R1, R2. The product is then stored in the register R3 to give the resulting data r3. In this case, the data exchange is completed in a clock cycle through the control of the switch device 320. In the next cycle, the cluster loaded with data issues the loaded data to the addition unit for addition. That is, in the first cycle, the cluster 110 executes the add instruction, whereas the cluster 111 does not process (i.e., executing a nop instruction). In the next cycle, the cluster 110 executes a store instruction to the specific address a0, while the cluster 111 executes a load instruction to the specific address a0. Therefore, the data in the cluster 110 are directly transmitted to the cluster 111 via the switch device 320, instead of via the memory subsystem 200. In the next cycle, the cluster 110 does a null action (i.e., executing a nop instruction), whereas the cluster 111 executes a multiplication instruction.

The above-mentioned data path is a simply store action for the cluster 110 and a simple load action for the cluster 111. In effect, the data exchange is accomplished by the controller 310 by the switch device 320. Therefore, no extra I/O port is needed for data exchange. No complicated control units are needed. The inter-cluster communication network can be readily implemented by using the original load/store instructions along with a controller and a switch device.

Certain variations would be apparent to those skilled in the art, which variations are considered within the spirit and scope of the claimed invention.

What is claimed is:

1. An inter-cluster communication module using the memory access network, comprising:
   a memory subsystem, having a plurality of memory banks, for storing a plurality of data, wherein each of the memory banks corresponds to an address;
   a switch device, connected to the memory subsystem, for transmitting the data;
   a plurality of clusters, connected to the switch device, for executing operations on the data; and
   a controller, connected to the switch device and having a detecting unit, for controlling transmissions of the data;
   wherein when one of the clusters issues the store instruction for one of the address, the controller controls the switch device so that the data in the cluster issuing the store instruction is written into the memory bank corresponding to the address via the switch device; wherein when one of the clusters issues the load instruction for one of the addresses, the controller controls the switch device so that the cluster issuing the load instruction loads the data in the memory bank corresponding to the address via the switch device; and wherein when the detecting unit detects that two of the clusters issue respectively a store instruction and a load instruction for the same address concurrently, the controller controls the switch device such that the cluster issuing the store instruction and the cluster issuing the load instruction perform respectively store and load operations for the data in the memory bank corresponding to the same address, and the data in the cluster issuing the store instruction are directly transmitted to the cluster issuing the load instruction via the switch device.

2. The inter-cluster communication module using the memory access network of claim 1, wherein each of the clusters has an address instruction of a specific address that is not one of the addresses corresponding to the memory banks.

3. The inter-cluster communication module using the memory access network of claim 2, wherein when two of the clusters issue respectively a store instruction and a load instruction for the specific address concurrently, the controller controls the switch device, such that the data in the cluster issuing the store instruction are directly transmitted to the cluster issuing the load instruction via the switch device.

4. The inter-cluster communication module using the memory access network of claim 3, wherein the controller is a memory controller.

5. The inter-cluster communication module using the memory access network of claim 3, wherein the switch device is a memory access network.

6. The inter-cluster communication module using the memory access network of claim 1, wherein the controller is a memory controller.

7. The inter-cluster communication module using the memory access network of claim 1, wherein the switch device is a memory access network.

8. The inter-cluster communication module using the memory access network of claim 1, wherein each of the clusters contains at least:
   a register file with a plurality of registers for temporarily holding the data; and
   at least one functional module, connected to the register file and having at least one functional unit, for executing operations of the data.

9. The inter-cluster communication module using the memory access network of claim 8, wherein one of the registers is a local register for storing an address instruction of a specific address.

10. The inter-cluster communication module using the memory access network of claim 9, wherein when two of the clusters issue respectively the store instruction and the load instruction for the specific address concurrently, the controller controls the switch device, such that the data in the cluster issuing the store instruction are directly transmitted to the cluster issuing the load instruction via the switch device.

11. The inter-cluster communication module using the memory access network of claim 8, wherein one of the functional units is a load/store unit (LSU) for selectively issuing the store instruction and the load instruction.

12. An inter-cluster communication module using the memory access network, comprising:

a memory subsystem, having a plurality of memory banks, for storing a plurality of data, each of the memory banks corresponds to an address;

a switch device, connected to the memory subsystem, for transmitting the data;

a controller, connected to the switch device and having a detecting unit, for controlling transmissions of the data; and a plurality of clusters, connected to the switch device, for executing operations for the data, wherein each of the clusters is stored with an address instruction of a specific address, when one of the clusters issues the store instruction for one of the address, the controller controls the switch device so that the data in the cluster issuing the store instruction is written into the memory bank corresponding to the address via the switch device, when one of the clusters issues the load instruction for one of the addresses, the controller controls the switch device so that the cluster issuing the load instruction loads the data in the memory bank corresponding to the address via the switch device, and when two of the clusters issue respectively a store instruction and a load instruction for the specific address concurrently, the controller controls the switch device, such that the data in the cluster issuing the store instruction are directly transmitted to the cluster issuing the load instruction via the switch device.

13. The inter-cluster communication module using the memory access network of claim 12, wherein the clusters access the data to the memory banks utilizing the corresponding addresses.

14. The inter-cluster communication module using the memory access network of claim 13, wherein the specific address that is not one of the addresses.

15. The inter-cluster communication module using the memory access network of claim 12, wherein the controller is a memory controller.

16. The inter-cluster communication module using the memory access network of claim 12, wherein the switch device is a memory access network.

17. The inter-cluster communication module using the memory access network of claim 12, wherein each of the clusters comprises:

a register file with a plurality of registers for temporarily holding the data; and at least one functional module, connected to the register file and having at least one functional unit, for executing operations of the data.

18. The inter-cluster communication module using the memory access network of claim 17, wherein one of the registers is a local register to store the address instruction of the specific address.

19. The inter-cluster communication module using the memory access network of claim 17, wherein one of the functional units is a load/store unit (LSU) for selectively issuing the store instruction and the load instruction.

* * * * *